Patented May 15, 1928.

1,670,016

UNITED STATES PATENT OFFICE.

LUDWIG BARTMANN, OF BERLIN, GERMANY, ASSIGNOR TO THE FIRM TREUHAND-GESELLSCHAFT M. B. H. BARTMANN & CO., OF HAGEN, WESTPHALIA, GERMANY.

METHOD OF TREATING CEREALS.

No Drawing. Application filed June 23, 1926, Serial No. 118,099, and in Germany November 17, 1924.

My invention consists in a process of treating cereals, which is applicable with particular advantage for the recovery of the endosperm in substantially pure condition and in which the grains are subjected to steeping and swelling in a suitable medium such as water.

The process according to the invention differs from previous steeping and macerating processes in that the treatment is carried through under such conditions that the germs or embryos forming part of the grains are paralyzed or killed and any deterioration of the nutritive matter contained in the grains is prevented.

The paralyzing or killing of the germs can be effected in different ways, for instance by acting on the grains during the steeping process with a substance, such as for instance formaldehyde, which, belonging to the class of poisons to vegetables, is at the same time capable of paralyzing or killing the germ and of exerting a tanning and toughening action on the husks. I can, however, also paralyze or kill the germs by alternate rapid heating and cooling of the grains or the steeping liquor, or both, during the steeping. As a third means for paralyzing or killing the germs may be mentioned agitation of or the effect of electrical concussions on the grains or the liquor containing them, this shock action having a disturbing effect on the life of the germs.

All of these means can be applied at the same time or one after the other.

By thus conducting the steeping treatment, I succeed in preventing not only germination but also fermentation, putrefaction and premature action of the enzymes during and, if desired, also after the steeping process.

The soaking or steeping of the grains under the above-mentioned conditions causes a swelling of the endosperm (which consists of starch and gluten) and of the husks and skins, while the natural condition of the nutritive matter and of the catalysts in the cereals is not changed thereby or shall at the utmost be influenced in a favourable way.
In contradistinction thereto the steeping processes hitherto suggested never considered all these conditions or else employed means such as the addition of alkalis or acids or of oxidizing or reducing means which did not lead to success. In many cases germination has even been promoted with intent, such germination having the result that the dough produced could not be baked and the bread became unfit for human digestion. In other cases the albuminous matter and the enzymes have been damaged.

According to the duration and intensity of the steeping the endosperm which in its natural condition is comparatively hard, is more or less softened by swelling. At first it assumes the form of a thick paste, after a certain time the paste becomes thinner and at the same time the husk is vigorously loosened from the endosperm. If the grains thus treated are subjected to a mechanical treatment at ordinary or elevated temperature wherein they are partly dried, the endosperm will again become harder, the loosening of the husk proceeding further. Also by adding chemicals, such as salt, preventing the swelling, the swelling process can be stopped or turned back at any desired point. With different cereals and also with different kinds of one and the same cereal one or the other of these conditions of the endosperm can be utilized.

It is essential for obtaining the best results that the chemical and biological condition of the raw endosperm remain as unaltered as possible and that putrefaction and fermentation as well as all injurious development of the embryo and the enzymes be prevented.

In addition to the use of paralyzing means I can replace the medium such as water, which surrounds the grains during the steeping, by another medium such as air by simply draining off the water and I can treat the grains after they have been cleaned or peeled or had their points cut off in dry or wet state. I can, for instance, treat the grains first during a short time with hot air, thereafter some time with cold air and can if necessary repeat this alternating treatment, whereupon air laden with moisture or some other gas, for instance air to which a small quantity of formaldehyde gas has been added, is caused to act on the grains.

I can, however, also proceed by first introducing the grains for a short time in hot water, thereafter in cold water, and after eventually repeating this alternating treatment continuing steeping them in water of for instance 30–35° C.

The examples recited above are merely designed to show that the process according to this invention can be varied within wide limits not only regarding the character of the medium but also regarding its temperature without departing from the aim of preventing germination, fermentation and putrefaction. On the contrary such variations will frequently exert a favorable influence.

Quite especially strong and rapid variations of temperature when starting the preliminary treatment of the grains have been proved to have a favorable action. It is for instance possible to first treat the grains during a very short time, for instance only during a few seconds, at a temperature above 100° C., for instance by dipping them into boiling water, care being taken to prevent dextrinization of the endosperm. If the grains are then quickly dipped into cold water or into a refrigerating solution, thereby cooling them down from 100° to 0° or below, the purpose of paralyzing the germ and the enzymes is also obtained in a very short time without killing them, and the steeping operation proper can then be proceeded with for instance at a temperature of 30–35° C. Its duration varies, for instance, between 8–24 hours.

The concentration of the solutions added in order to prevent germination, fermentation, putrefaction and so on can be varied within predetermined limits. It is for instance possible to use a watery solution containing 30–40% formaldehyde gas and to first treat the grains during a few seconds with water containing 0,6% of such a solution (which is about 0,2% formaldehyde gas), thereafter during a longer time with water containing 0,3% of such a solution and near the end of the operation with a still more dilute solution. Preferably this weak solution is replaced near the end of the operation by pure water or the like. Care must always be taken that only such concentrations are used which do not cause any injurious alteration of the endosperm.

The different modes of treatment above described can be reinforced or reduced by treating the grains either at rest or in motion, for instance in a flowing liquid, the movement of the liquid again counteracting germination.

By the steeping treatment above described and the swelling of the endosperm accompanying same the endosperm is loosened from the layers surrounding it, which are constituted by the cellular husks or pericarp and the aleuron layer or perisperm arranged intermediate the husks and the endosperm. The use of formaldehyde for the paralyzing or killing of the germs or embryos during the steeping and swelling also exerts a tanning action on the outer layers, and if the steeping operation is continued long enough, the husks and aleuron layer will become tough and leatherlike, while the swollen endosperm will be converted into a soft paste. By exerting pressure on the swollen grains the husks and aleuron layer can be made to burst, the soft pasty endosperm being expelled by the pressure.

In order to further the loosening of the husk from the endosperm by causing one or both of these parts to swell I can use instead of formaldehyde or together with it other antiseptically acting or paralyzing chemicals. However, all these additions must be used in such small quantities that their residues which may remain in the endosperm or in the husk are absolutely harmless.

In order to attain this end these additions can be neutralized at a suitable moment.

By treating the grains as described with substances adapted to paralyze or kill the germ or by rapidly varying the temperature of the steeping medium also such insects and insects' eggs are destroyed which may be admixed to the grains.

I can also carry through the steeping operation in several different steeping liquors, placing the grains for instance during some time into a liquor containing a little acid, thereafter into a liquor containing a little alkali and then into a liquor containing formaldehyde. The sequence of liquors depends upon the end result to be attained, i. e. which degree of softening or which condition of the layers in the grains shall be obtained.

I continue the steeping operation until either the endosperm or also the cellulose layers of the grains are swollen and softened. The duration of the steeping operation depends upon the kinds of cereals treated. Thus, for instance, non-husked rye requires about 16 hours, non-husked wheat 20–25 hours. Husking or shelling reduces the time required for the steeping and also effects a saving of substances to be added to the liquor.

The swelling process proceeds gradually from the outside towards the interior of the grains. It is reversible, so that it is possible to interrupt the swelling at any point and to reverse the process either by hardening (this being already effected by cooling, for instance with the aid of cold water), or by allowing the grains to stand and finally by drying preferably at 30-35° C., the endosperm being thus rendered more solid and being eventually reduced to its original condition. Also when thus restituting the original condition of the endosperm all the changes can be stopped at a suitable point and the grains can be subjected to further treatment in that condition. Care must of course be taken that the shells and skins are not brittle, in order to avoid injurious splintering.

When the steeping procedure according to this invention has come to an end the grains are rinsed in warm or cold water and are subjected in soft condition to pressure, whereby the endosperm is expelled or whereby the grains are crushed or cut to pieces. Whether the steeping process has been carried out correctly can be shown by ascertaining whether the contents of the grains can be reduced to its natural condition. In every case the endosperm must have remained endosperm without having lost any of its properties.

If it is not intended to separate the softened endosperm from the husk, then the grains can be crushed or cut in suitable devices such as disintegrating mills, crushing mills, roller mills or cutters of all kinds. I may also use the grinders employed in reducing potatoes to pulp. If the whole grains or only the husks are finely disintegrated the aleuron layer can also be comminuted.

The crushed or cut grains can then be subjected together with the husk particles contained therein to a fermentation and baking process in order to directly produce a whole meal bread which is lighter in color than ordinary whole meal bread, inasmuch as the steeping according to this invention has for its effect that a great part of the coloring substance and the vegetable glue layer (the so-called brown layer of the seed shell) is dissolved in the steeping liquor and can be removed when washing the softened grains or in the course of the steeping process.

During the steeping substances can be added to the swelling, swollen or hardening endosperm, such as have hitherto been used for improving the baking capacity of the flour (gases, solutions of salts and the like, emulsions and the like). I can for instance introduce into the grains ammonia gas or a solution of ammonia together with the steeping liquor (water), thereby influencing the endosperm while it is still surrounded by the husk. I can, however, also influence in such manner the endosperm freed from the husk or even the dough made from such endosperm.

The steeping liquor, for instance water, is preferably maintained at a temperature of 30-35° C.

Before the expulsion of the endosperm the grains are preferably allowed to dry down to some extent, not, however, in order to reduce their content of moisture, but in the first line in order to obtain a certain shrinking of the endosperm, which has for its effect to loosen the cohesion between the endosperm and the inner wall of the aleuron layer, so that the separation of the husk and skins from the endosperm is facilitated.

I wish it to be understood that I do not desire to be limited to the exact details of operations and devices shown and described for obvious modifications will occur to a person skilled in the art.

I claim:

1. The process of treating cereals which consists in subjecting the grains of such cereal substantially at normal temperature to treatment adapted to cause a swelling and relative loosening of the endosperm and the layers surrounding same, at the same time paralyzing the germs or embryos forming part of such grains by rapidly varying the temperature of the grains.

2. The process of treating cereals which consists in subjecting the grains of such cereal substantially at normal temperature to treatment adapted to cause a swelling and relative loosening of the endosperm and the layers surrounding same, at the same time paralyzing the germs or embryos forming part of such grains by first heating the grains for a short time and thereafter suddenly reducing their temperature to the normal.

3. The process of treating cereals which consists in subjecting the grains of such cereal substantially at normal temperature to treatment adapted to cause a swelling and relative loosening of the endosperm and the layers surrounding same, at the same time paralyzing the germs or embryos forming part of such grains by acting thereon with a substance having the character of a plant poison and rapidly varying the temperature of the grains.

4. The process of treating cereals which consists in subjecting the grains of such cereal substantially at normal temperature to treatment adapted to cause a swelling and relative loosening of the endosperm and the layers surrounding same, at the same time paralyzing the germs or embryos forming part of such grains and thereafter causing the swelling process to be reversed and the grains to lose part of the absorbed moisture.

5. The process of treating cereals which consists in subjecting the grains of such cereal substantially at normal temperature to treatment adapted to cause a swelling and relative loosening of the endosperm and the layers surrounding same, at the same time paralyzing the germs or embryos forming part of such grains and thereafter causing the swelling process to be reversed by partly drying the grains.

6. The process of treating cereals which consists in subjecting the grains of such cereal substantially at normal temperature to treatment adapted to cause a swelling and relative loosening of the endosperm and the layers surrounding same, at the same time paralyzing the germs or embryos forming part of such grains by acting thereon with formaldehyde and rapidly varying the temperature of the grains.

In testimony whereof I affix my signature.

LUDWIG BARTMANN.